United States Patent [19]
Thanghe

[11] 3,973,315
[45] Aug. 10, 1976

[54] DEMOLITION TOOL

[76] Inventor: Arthur E. Thanghe, 629-6th St. SE., Minneapolis, Minn. 55414

[22] Filed: June 6, 1975

[21] Appl. No.: 584,691

[52] U.S. Cl. .......... 29/239; 29/256
[51] Int. Cl.[2] .......... B23P 19/04
[58] Field of Search .......... 29/239, 244, 256, 257

[56] References Cited

UNITED STATES PATENTS

| | | | |
|---|---|---|---|
| 1,519,067 | 12/1924 | Smith | 29/256 |
| 1,522,141 | 1/1925 | Raby | 29/256 |
| 1,828,758 | 10/1931 | Zimmerman | 29/256 |
| 3,022,043 | 2/1963 | Weiss | 254/98 |

*Primary Examiner*—James L. Jones, Jr.
*Attorney, Agent, or Firm*—Merchant, Gould, Smith, Edell, Welter & Schmidt

[57] ABSTRACT

A tool for use in demolition of frame structures to preserve the lumber for reuse. A frame is secured to a timber, to which a board to be removed is nailed, by quick acting means including an overcenter connection. A pressure foot projecting from the frame bears against the back of the board to be removed. By a screw-acting mechanism in the frame the board is forced away from the timber over its entire width without splitting, pulling the nails as it does so.

11 Claims, 7 Drawing Figures

DEMOLITION TOOL

BACKGROUND OF THE INVENTION

This invention relates to the mechanic arts, and particularly to the field of building demolition. It often happens that the site of an urban renewal or other building project is already occupied by structures which are not suited for the new use, or are in ill repair, and hence must be removed. Such structures are frequently of frame construction and contain sheathing, roofing, flooring, and similar boards which would have value for reuse. Usually, however, no attempt is made to salvage this material, and the whole structure is torn apart by a wrecking crane and hauled away as trash to be disposed of. Sometimes this is due to the pressure of time within which the new work must be accomplished, but very often it is simply because the reclamation of such used lumber is not economically feasible. The cost of the labor needed to disassemble a structure in a way which preserves usable materials is one factor, and another factor is the relatively low yield of usable material due, for example, to splitting of boards incidental to the wrecking process. The usual tools employed in demolition are hammers and wrecking bars: occasionally nail pullers are used, but pulling nails individually is a tedious process which is slow and hence expensive in labor costs. The concentrated impact of hammer blows mars the boards, and often causes breakage, while wrecking bars are almost ideally designed to split boards lengthwise in the act of removing them.

I have invented a tool for use in demolishing frame buildings, which is inexpensive, efficient, and easy to use, and which acts on substantially the entire width of the board being removed, rather than along one edge only, to continuously and smoothly separate the board from the timber to which it is nailed. My tool is usable in any position, to remove sheathing, roofing, of flooring boards, wherever access can be had to the rear surface of the boards and the timbers to which they are nailed. My tool involves no impact forces and no cross grain leverage forces, and hence its use results in a high proportion of undamaged boards fit for salvage.

SUMMARY OF THE INVENTION

My demolition tool comprises a frame and means for clamping the frame to a timber behind a board to be removed. Linearly movable in the frame is a member which includes a pressure foot of length only slightly less than the width of the board being removed, and means are provided for causing movement of the member so that the pressure foot first engages the back surface of the board and then forces it away from the timber, thus drawing the nails without splitting the board or damaging either of its faces.

Various advantages and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

DESCRIPTION OF THE PREFERRED EMBODIMENT

Figure 1:
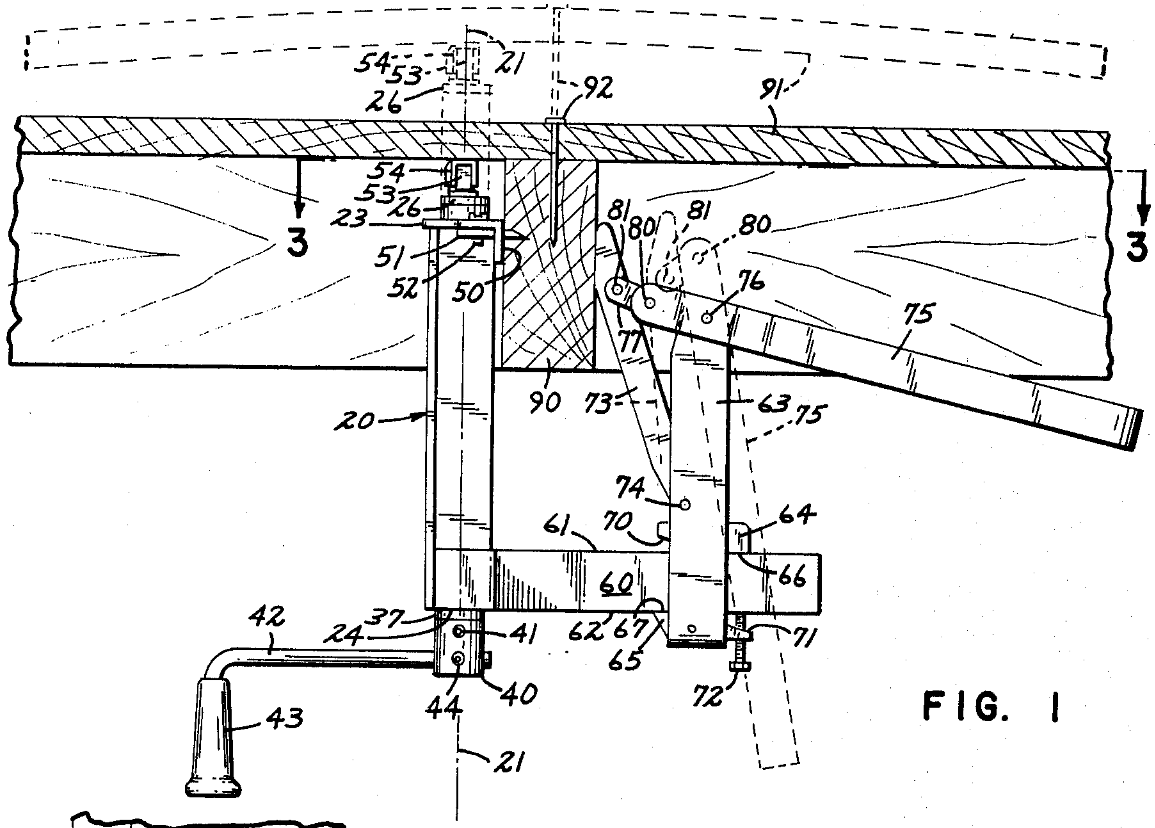
FIG. 1 is a plan view showing my demolition tool in use.

As shown in the drawings, my invention comprises an elongated frame 20 having a longitudinal axis 21 and a longitudinal guideway 22 extending between a first end 23 and a second end 24 of the frame. A member 25 is linearly movable along axis 21, and extends beyond the end 23 of the frame 20 at 26. Member 25 is fastened as by a threaded connection 27 to the body of a nut 30 which slides in guideway 22 without rotating about axis 21. Cooperating with nut 30 is a screw 31. While elements 30 and 31 are shown as cooperating with a plurality of steel balls 32 and recirculating tube 33 to comprise a low friction connection of a well known type, a simple nut and screw with standard Acme or square threads may be used if desired. Screw 31 has an enlarged collar 34 beyond which it extends as a shaft 35 passing through a thrust bearing 36, end 24 of frame 20, and a thrust washer 37. An outer hub 40 is secured to shaft 35 as at 41, and is cross bored to receive a crank 42 having a rotatable knob 43, and secured in hub 40 as at 44.

Member 25 is hollow and the portion of screw 31 which extends beyond nut 30 is contained within the member and carries at its outer end 45 a disc 46 which is a loose fit in the hollow 47 of the member. Frame 20 has a face 50 which is parallel with axis 21. A plurality of teeth 51 extend away from face 50 and are secured to end 23 of frame 20 by suitable fasteners 52.

Figure 2:
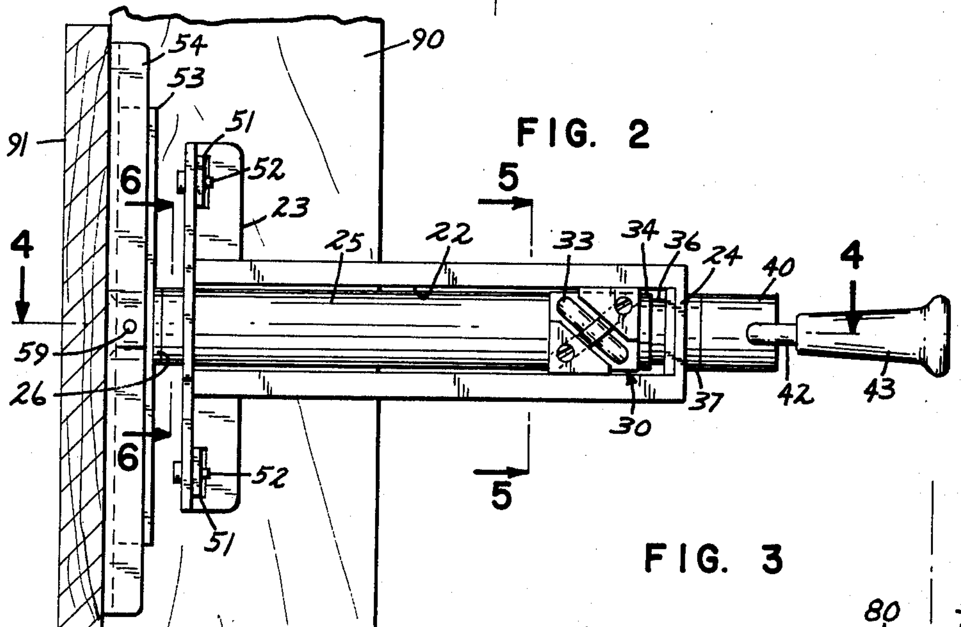
FIG. 2 is a side elevation.
Figure 3:
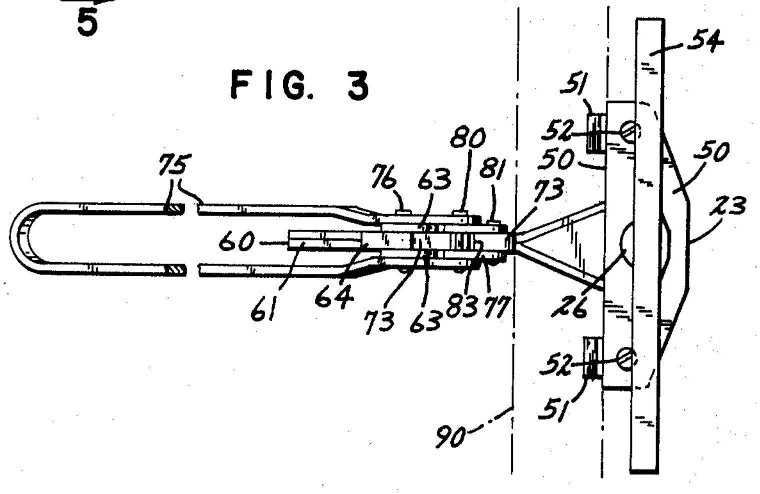
FIG. 3 is a fragmentary view taken along the line 3—3 of FIG. 1.
Figure 4:
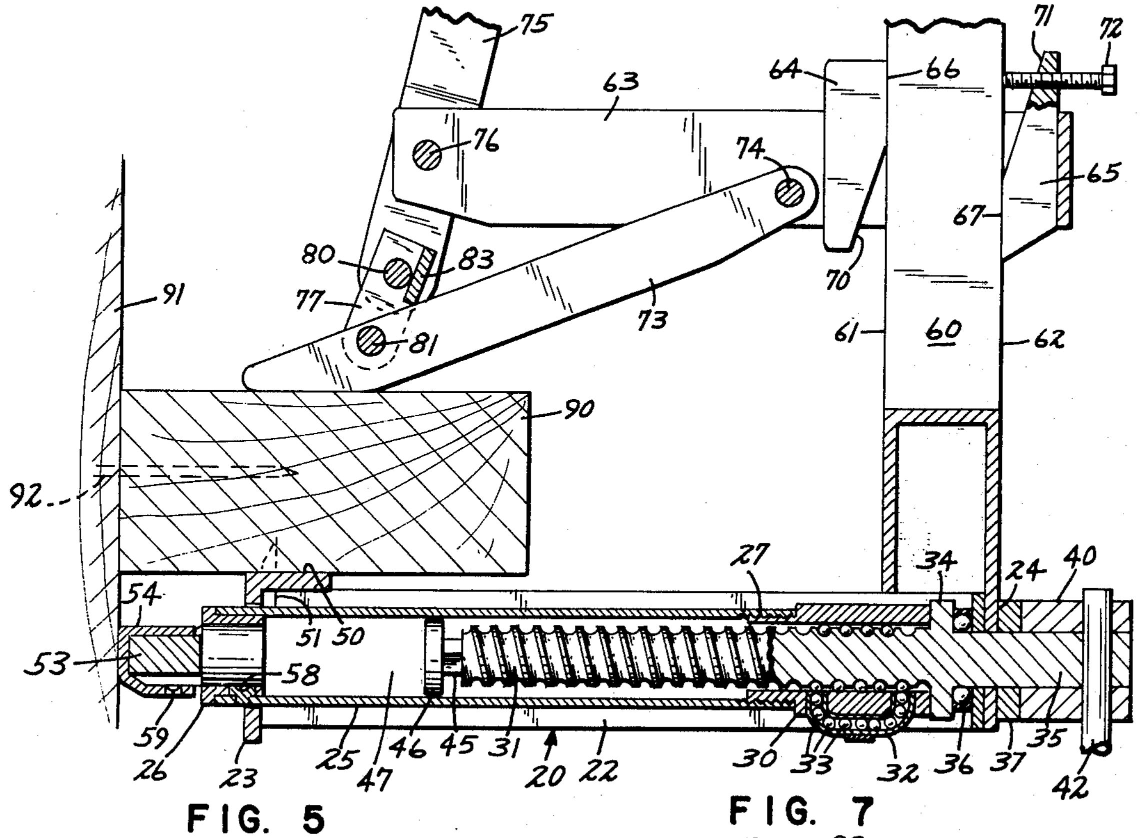
FIG. 4 is a sectional view taken along the line 4—4 of FIG. 2.
Figure 5:
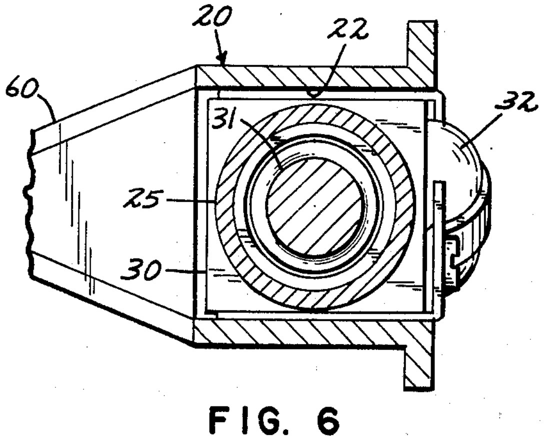
FIG. 5 is a sectional view taken along the line 5—5 of FIG. 2.
Figure 6:
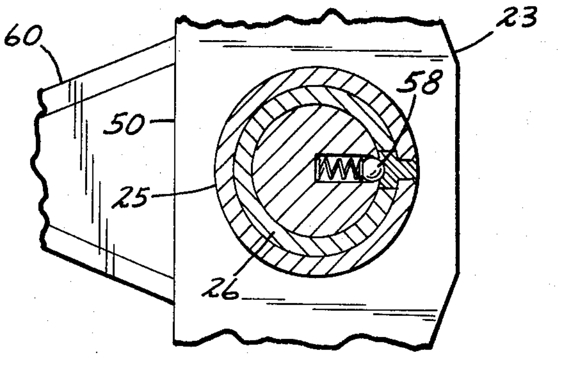
FIG. 6 is a sectional view taken along the line 6—6 of FIG. 2.

A pressure foot 53 is removably retained in the end 26 of member 25 beyond end 23 by means such as a ball detent 58, and extends perpendicular to axis 21. It is desirable that the length of this foot be different for different applications, and FIG. 2 shows a second, longer foot 54 as being removably secured on foot 53 by means such as a ball detent 59.

An arm 60 is secured to frame 20 near end 24, and extends from the frame in the same direction as teeth 51. Arm 60 has a pair of substantially parallel faces 61 and 62 generally orthogonal to axis 21, and a carrier 63 is movable along arm 60. At one end, carrier 63 rigidly is connected to a pair of shoes 64 and 65 having first parallel surfaces 66 and 67 spaced by substantially the distance between surfaces 61 and 62. A second pair of surfaces 70 and 71 make dihedral angles with the surfaces 66 and 67, respectively. The vertices of these angles are substantially in a plane parallel to axis 21, but may be slightly offset so that the vertex of shoe 64 is slightly further from, and that of shoe 65 is slightly nearer to, frame 20. The distance between parallel surfaces 70 and 71 is greater than that between surfaces 66 and 67 so that if carrier 63 is rotated in a counter-clockwise direction the fit of the shoes on arm 60 is perceptably looser. A set screw 72 is provided in shoe 65 to hold the carrier in any desired position along arm 60.

A jaw 73 is pivoted to carrier 63 at 74, and a handle 75 is pivoted to carrier 73 at 76. The end of handle 75 is connected to jaw 73 by a link 77, pivoted to the handle at 80 and to the jaw at 81. Members 73 – 81 comprise an overcenter mechanism 82 for locking arm 73 in a desired position. Link 77 may be configured as at 83 to provide a stop in the overcenter condition of the assembly.

Figure 7:
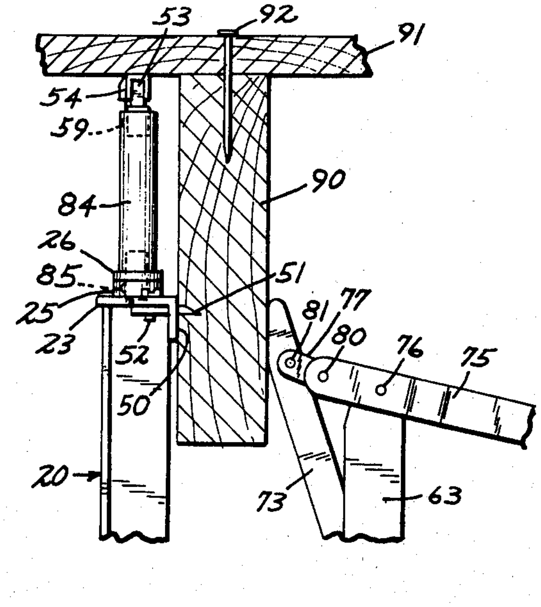
FIG. 7 is a fragmentary view of the tool showing a modification.

In order to make the use of my tool more convenient where boards are to be removed from wider timbers, I provide an extension 84 for member 25, as is shown in FIG. 7. This extension is arranged to cooperate with ball detent 58, and has a similar ball detent 85 for cooperating with pressure foot 53.

OPERATION

My tool is used, as shown in FIG. 1, in the following fashion. It is desired to remove from a timber 90, such as a two-by-four, a board 91 which is held to the timber by nails 92. Set screw 72 is loosened to allow movement of carrier 63 along arm 60, and a foot 54 slightly shorter than the width of the board to be removed is used. With member 25 retracted as far as possible into frame 20 by the use of crank 42, the tool is positioned so that foot 54 is against board 91 near timber 90, and face 50 is toward the timber with teeth 51 touching it. With handle 75 in the broken line position of FIG. 1, carrier 63 is moved along arm 60 toward timber 90 until jaw 73 is close to or touching the timber, and handle 75 is then moved to its solid line position. The causes faces 66 and 67 to engage faces 61 and 62 securely, and draws teeth 51 into the timber. Set screw 72 may be tightened, and the tool is now secured to timber 90. Operation of crank 42 rotates screw 31 to drive nut 30, and with it member 25, toward board 91. Powerful forces are put into action and the board is displaced smoothly from the timber, the nails usually being drawn as well. Sometimes in old work, the head of a badly rusted nail may be pulled through the board, but the hole thus produced is a relatively minor imperfection in used lumber.

Handle 75 is now reversed to allow the teeth to be extracted from the timber, the tool is repositioned, and the work continues. It will be apparent that the operation just described is simple to perform, requires no great strength of the operator, is free from the noise and dust which accompany impact operations, and has no tendency to split the boards.

While I have shown a screw as the driving element for member 25, it will be apparent that mechanical equivalents may be used as preferred. I also contemplate that for major demolition projects, my member 25 may be arranged for pneumatic or hydraulic actuation, when this additional complication is felt justified.

From the above it will be evident that I have invented a demolition tool which is simple, easy to use, relatively inexpensive, quiet and clean, which may be used to remove boards of various widths from timbers of various thicknesses, which causes minimum damage to the lumber being reclaimed, and which may be arranged for either manual or fluidic actuation.

Numerous characteristics and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. A demolition tool for separating boards from timbers to which they are nailed comprising, in combination:

an elongated frame having a longitudinal axis, a face parallel to said axis, and a guideway extending along said axis between first and second ends of the frame;

a member mounted for linear movement in said guideway along said axis, and having an outer end extending beyond said first end of said frame;

means acting transversely to said axis for removably clamping said face of said frame against a timber so that said axis is perpendicular to a board to be removed, and said outer end of said member extends toward the boards to be separated;

and drive means operable to cause said linear movement of said member whereby the outer end thereof contacts the board and forces it away from the timber.

2. The structure of claim 1 in which said outer end of said member comprises an elongated, outwardly flat pressure foot extending transversely to said axis and to the line of action of the clamping means for engaging the board over at least a major portion of its width.

3. The structure of claim 1 in which said drive means comprises a screw, means mounting said screw in the second end of said frame for rotation about said axis without linear movement with respect thereto, a nut carried by said member and threadedly engaging said screw, and manual means for causing said rotation of said screw.

4. A demolition tool for separating boards from timbers to which they are nailed comprising, in combination:

an elongated frame having a longitudinal axis, a face parallel to said axis, and a guideway extending along said axis between first and second ends of the frame;

a member mounted for linear movement in said guideway along said axis, and having an outer end extending beyond said first end of said frame;

means for removably clamping said frame against a timber so that said axis is perpendicular to a board to be removed, and said outer end of said member extends toward the boards;

and drive means operable to cause said linear movement of said member whereby the latter contacts the board and forces it away from the timber; the clamping means comprising:

an arm extending perpendicularly from the face of said frame;

a carrier movable along said arm and extending generally along and parallel to said frame;

a jaw pivoted to said carrier;

means fixing the position of said carrier on said arm; and overcenter means for impelling said jaw toward said face.

5. The structure of claim 4 in which said overcenter means includes a handle pivoted to said carrier and a link pivotally connecting said handle and said jaw.

6. The structure of claim 1 together with at least one tooth extending from said face for embedment in the timber when the clamping means is operated.

7. The structure of claim 3 together with means for changing the distance by which said outer end of said member extends beyond said first end of said frame for any position of said nut on said screw.

8. The structure of claim 2 together with means for changing the transverse length of said pressure foot.

9. The structure of claim 4 together with means for varying the point of fixation of said carrier on said arm.

10. The structure of claim 3 in which said member is hollow axially at least in part, and the portion of said screw which extends beyond said nut is enclosed by the hollow part of said member.

11. The structure of claim 4 in which said arm includes a pair of parallel faces and said carrier includes a pair of shoes having first substantially parallel surfaces positioned to engage said surfaces of said arm, second substantially parallel surfaces making opposite dihedral angles with said first surfaces, the vertices of said dihedral angles lying substantially in a plane parallel to said face, and means carried by one of said shoes for engaging said arm to lock said carrier in position thereon, the disposition of said shoes being such that force exerted by said jaw on said carrier is in a direction to rock said carrier so that said jaws more closely engage said arm.

* * * * *